Sept. 26, 1967     R. H. ANDERSON ETAL     3,343,698
PLASTIC CONTAINER CONSTRUCTION
Filed May 16, 1966     2 Sheets-Sheet 1

RUSSELL H. ANDERSON
JOHN P. CAMPANELLI
INVENTORS

BY *Edward L. Bell*

ATTORNEY

Sept. 26, 1967 R. H. ANDERSON ETAL 3,343,698
PLASTIC CONTAINER CONSTRUCTION
Filed May 16, 1966 2 Sheets-Sheet 2
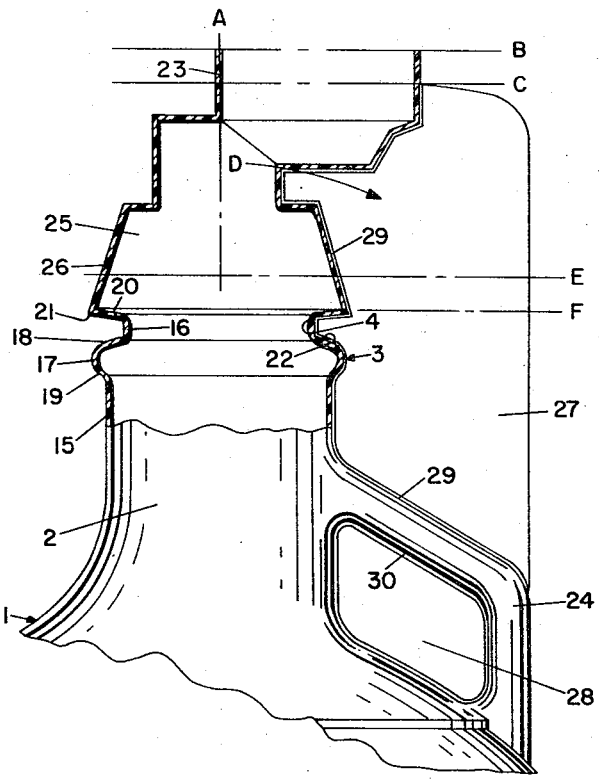
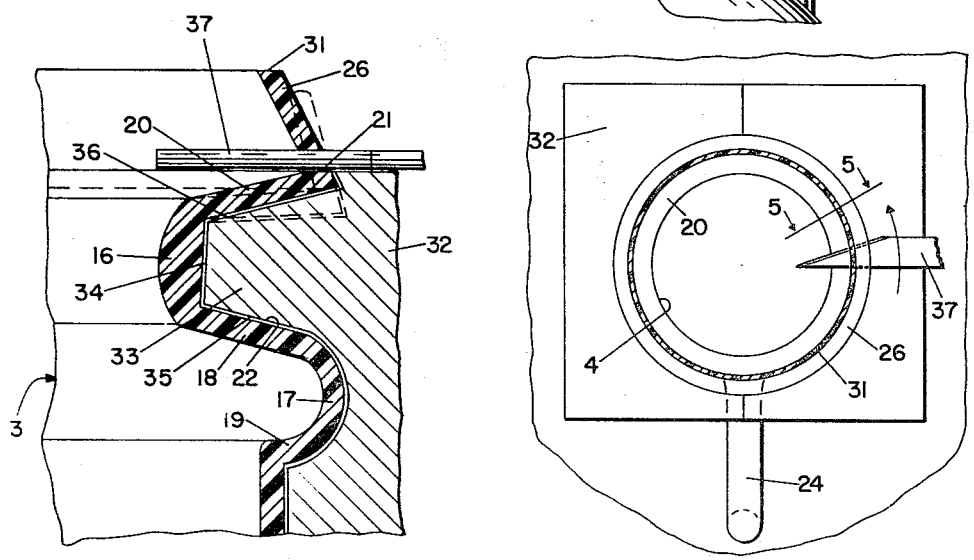
RUSSELL H. ANDERSON
JOHN P. CAMPANELLI
INVENTORS
BY *Edward L. Bell*
ATTORNEY

United States Patent Office 3,343,698
Patented Sept. 26, 1967

3,343,698
PLASTIC CONTAINER CONSTRUCTION
Russell H. Anderson, Hartsdale, and John P. Campanelli, Bethpage, N.Y., assignors to Haskon, Inc., Long Island City, N.Y., a corporation of Delaware
Filed May 16, 1966, Ser. No. 550,485
3 Claims. (Cl. 215—31)

This application is a continuation-in-part of our prior United States patent application Ser. No. 473,736, filed July 21, 1965, and now abandoned.

This invention relates to a container of semi-rigid material, for example, a plastic milk bottle, and more particularly to the neck portion or finish of such a container, that is, to that portion of the container about the opening which defines the mouth of the container and which receives the closure for sealing the mouth.

It is essential that the opening of a container be capped or sealed by a closure capable of resisting the forces encountered in the normal use of the container that tend to unseat the closure or to force it off the container. With semi-rigid, or more particularly with plastic containers, this problem is acute because of the inherent elasticity or deformability of the container which limits the magnitude of the sealing forces that can be developed between the closure and its seat and which also causes surging of the contents of the container when it is subjected to an abrupt jar such as occurs when it is dropped or is handled roughly.

Another problem encountered with plastic containers is that chips may get into the container during the finishing of the neck. In blow molding plastic containers, the flashing and other waste material about the neck must be removed in the finishing of the container. As this excess material is trimmed, there is the danger that the trimmings may fall into the container through the opening and, because of the adherence of the trimmings to the container that is generated, for example by static electricity, such trimmings adhere to the walls of the container and are difficult to remove.

A further problem encountered in making plastic containers is to provide a neck opening that is circular within sufficiently close tolerances to receive and to hold a closure firmly enough to provide a tight seal at all points around the periphery of the closure. Reaming the opening to make it circular, as has been practiced, has the disadvantage that the opening so produced often is not concentric so that the wall of the container about the opening does not have a uniform thickness, but rather has thin and therefore weak areas or, in extreme cases, breakouts. This problem is aggravated by the difficulty of firmly holding and positioning a non-rigid plastic article. Another disadvantage of reaming the opening is that it produces chips that may fall into the container through the opening of be pulled into it by the attraction of the static electricity and must be removed.

In blow molding of plastic articles, there is also a problem caused by the uneven cooling of the material in the mold because of the varying thicknesses of the material and because some portions of the original material are not enclosed in the mold, and the consequent uneven shrinkage as the article continues to cool after leaving the mold.

In accordance with the above, it is an object of this invention to provide a container of semi-rigid material such as a thermoplastic, which container is designed to receive a closure and to hold the closure with sufficient force to prevent accidental dislodgment of it in normal use. Another object of this invention is to provide a plastic container in which there is a reduced tendency for trimmings or chips to enter the container through the mouth during manufacture thereof. A further object of this invention is to provide a plastic container that can be formed economically by conventional blow molding techniques and in which the finish is accurately formed with a mouth that is circular within close tolerance and with a wall of uniform thickness surrounding the mouth. A further object of this invention is to provide a plastic container that is adapted to receive conventional closures of the type used on rigid containers such as glass milk bottles, that is, the hood-type and the cap-type closures, which, while usually of paper, may be of plastic or other materials. Further objects of this invention are to provide a plastic container with a finish that is economical in that it can be formed by conventional blow molding techniques with a minimum of defective containers, in which the neck flashing or moil and other waste material about the neck can be readily and accurately trimmed, which can be capped or closed by existing capping machines, and which requires a minimum of material.

Broadly, the invention comprises a plastic container in which the finish or closure-receiving portion comprises an integral extension of the neck of the container and includes a cylindrical plug-receiving wall that is adapted to receive the plug portion of a closure, an outwardly-directed pouring flange at the outer end of the wall, and an outwardly-directed shoulder extending from the inner end of the wall to the neck of the container, which shoulder is opposed to the flange and, together with the wall and the flange, define an outwardly open groove. The container is adapted to be blow molded from an extruded tube of plastic, with the neck flashing and other waste extending integrally from the outer edge of the flange. The flexibility provided by the flange is capable of accommodating the deformation caused by the uneven shrinkage of the flashing and the molded article without being permanently deformed, and at the same time, after a rough trimming to remove most of the neck waste, the remaining neck waste can be accurately trimmed from the edge of the flange by a cutter that operates while the edge of the flange is accurately positioned by means of a die inserted into the groove in the finish and acting between the shoulder and the flange to deflect the edge of the flange to the desired position, thereby positively holding the container and positioning the flange for trimming. With the plug-receiving wall dimensioned relative to the cylindrical wall of the plug portion of a conventional bottle closure and with the flange dimensioned relative to the cover portion thereof, the present finish is adapted to receive conventional plug-type closures applied thereto by conventional capping machinery. At the same time, by forming the shoulder as a part of a bead having a second shoulder that extends from the bead to the neck of the container, the finish is adapted to receive the so-called hood-type closure in which the deformable skirt portion is closed under the second shoulder.

With the above and other objects in view, a presently preferred embodiment of the invention is hereinafter described in connection with the accompanying drawings, in which:

FIG. 3 is a fragmentary view similar to FIG. 1, but illustrating the container as it is ejected from the mold and before removing the flashing and trimming the finish.

FIG. 4 is a fragmentary top plan view of the container and the die for holding the container and positioning the flange during trimming.

FIG. 5 is a fragmentary sectional view taken substantially on the line 5—5 of FIG. 4.

Figure 1:
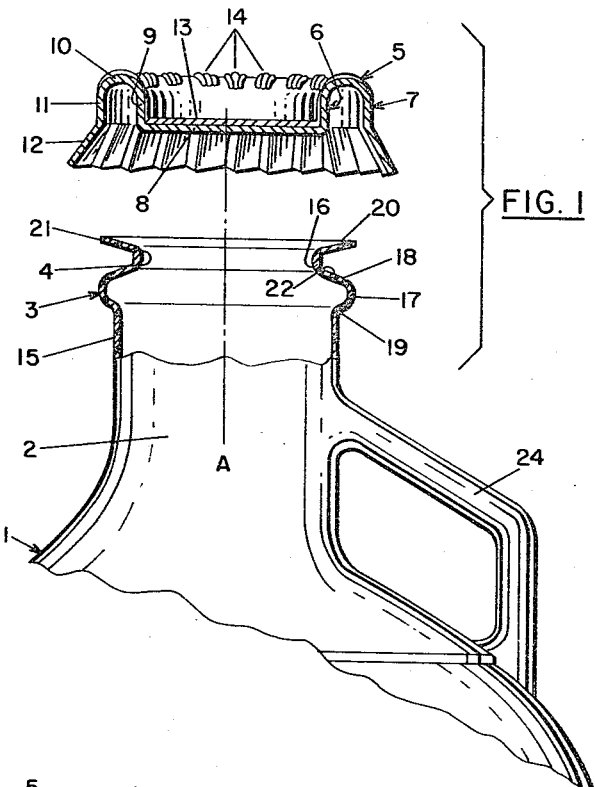
FIG. 1 is a fragmentary view, partly in section and partly in elevation, of a container in accordance with this invention, together with a hood-type closure before the closure is applied to the container.

With reference to the drawings, there is illustrated a portion of a plastic container 1 having a neck 2 and a finish or closure-receiving portion 3 with a mouth 4 that is adapted to be closed, for example, by a hood-type closure 5.

The illustrated closure 5, which is of conventional construction, comprises a plug portion 6 that is adapted to seal the mouth 4 of the container and a cover portion 7 that is adapted to cover the pouring lip of the container. More particularly, the plug portion 6 includes a diaphragm 8 and a generally cylindrical wall 9 integral with the diaphragm 8 and extending normally from the periphery thereof, and the cover portion 7 includes a substantially annular rim 10 extending outwardly from the wall 9 at the end opposite from the diaphragm 8, and a depending skirt 11 that terminates in a flared and pleated portion 12 that is adapted to close and to be sealed under a shoulder on the container. The closure 5 may also be provided with the usual disc 13 that is pressed onto the diaphragm 8 to add rigidity to the diaphragm, and with ribs 14 for reinforcing the rim 10 and the skirt 11.

The finish 3 of the container comprises an integral extension of the side wall 15 of the neck 2 and includes a substantially cylindrical plug-receiving wall 16 that is adapted to receive the plug portion 6 of the closure 5. Between the wall 16 and the neck 2 of the container is a radially outwardly bowed circumferential bead 17 having its one wall, that is, the wall that is outermost of the container in the direction of the axis A of the mouth 4 and the one that is adjacent to the wall 16, forming a shoulder 18 that extends radially outwardly from the wall 16. The other wall of the bead 17 forms a shoulder 19 that extends radially outwardly from the neck 2. On the end of the wall 16 that is outwardly of the container axially of the mouth 4, there is provided a radially outwardly directed flange 20 that serves as a pouring flange and is therefore preferably inclined slightly with respect to a plane normal to the axis A of the mouth 4. The flange 20 terminates in a free edge 21 having a diameter substantially equal to the maximum diameter of the bead 17. The flange 20 is thus opposed to the shoulder 18 and, together with the shoulder 18 and the wall 16, defines an outwardly open groove 22.

In order to receive the closure 5 and to insure a tight seal between the wall 16 and the closure, the diameter of the mouth 4 is made slightly less than the outer diameter of the plug portion 6 of the closure so that the plug portion 6 must be pressed into the opening. The length of the wall 9 of the closure 5 in the direction of the axis A is made slightly greater than the length of the wall 16 so that when the rim 10 of the closure is seated on the flange 20, the diaphragm 8 of the closure is at least partially under the wall 16 and will expand into the bead 17 as shown to hold the closure securely on the container.

In addition to the advantages in the sealing of the closure and in the pouring facility, one of the primary advantages of the container in accordance with this invention in that it is adapted to be manufactured by conventional blow molding, that is, in which a parison of the melted plastic material is extruded into the space between a pair of molds which are then closed upon the parison and the parison is expanded into the mold cavities by a blowing agent such as air introduced into the parison through, for example, a nozzle in the extrusion die, and finally, after the material is set, the molds are opened, the parison is severed from the extrusion die, and the part is ejected. A further advantage of the invention is in the accurate trimming of the finish of the container.

In order to illustrate the advantages of the invention in the manufacture of the container, reference is made to FIG. 3, in which there is illustrated a container as it is ejected from the mold, the parison having been severed from the extrusion die along the line B to produce a short length of the original parison, which is herein referred to as the parison 23, between the severing line B and the line C, which represents the top of the material enclosed in the molds. The parison 23 is not enclosed within the molds and thus is not cooled by the molds, and is not subjected to the blowing pressure so that when the container is ejected from the mold, it has cooled only slightly from its molten condition and has the shape of the original extruded tube but deformed by the sagging that occurs during the molding and setting of the container.

In the illustrated container, the parison 23 is offset to the right relative to the axis A of the opening 4 in order to provide material in the handle 24. Within the mold, that is below the line C, there is provided what is herein termed the blow chamber 25, through which the blowing agent or air is introduced. The blow chamber 25 constitutes an integral extension of the flange 20 and specifically has the wall 26 thereof integral with the peripheral edge 21 of the flange 20. In addition to serving as the means for introducing the blowing air to the container, the blow chamber 25 also aids to form the finish 3 and to insulate the container from the heat of the parison 23 after the container is ejected from the mold. To assist in forming the finish 3, the chamber 25 is, like the flange 20, circular in cross-section and, adjacent to the flange 20, is of substantially the same diameter as the flange 20, and of gradually decreasing diameter outwardly along the axis A. Thus, the material is formed smoothly and uniformly over the wall 16 and into the bead 17 and flange 20 to produce a more nearly uniform wall thickness from the wall 15 of the neck 2 through the bead 17, the wall 16 and the flange 20, and the opening 4 is more nearly round. With respect to the insulation of the container from the heat of the parison 23, as hereinbefore noted, the parison 23 was not enclosed within the mold and is therefore only partially cooled from the melt temperature when the container is ejected from the mold, and because it has not been thinned by blowing, it retains a significant amount of heat. Thus, when the container is ejected from the mold, the heated parison heats the adjacent material, which heat must pass progressively through the blow chamber 25 before it will affect the container itself.

In addition to the parison 23, the blow molding also produces other waste about the neck 2, that is, the flashing 27 between the parison 23 and the handle 24 and the flashing 28 within the handle 24. The flashings 27 and 28 consists of the doubled or collapsed portions of the original extruded tube or parison that was within the confines of the mold but was outside of the mold cavity. The flashing is integral with the container and is connected thereto by the thinned sections 29 and 30, respectively, which are formed at the meeting edges of the molds. Because of the heavy thickness of the flashings 27 and 28, they, like the parison 23, are at a much higher temperature than the container itself at the time the container is ejected from the mold.

The blow chamber 25 and the thinned sections 29 and 30, as well as the poor thermal conductivity of the material, afford significant insulation of the container from the heat of the parison 23 and the flashings 27 and 28. This heat, if permitted to reheat the adjacent portions of the container, would increase the possibility of distortion because it would soften the container, which, while set, is still at a high temperature.

A further problem that results from the heat of the parison 23 and the flashings 27 and 28 is the distortions caused by the uneven shrinkage as the different parts cool. The effects of this distortion are minimized with the construction in accordance with this invention because of the flexibility afforded by the flange 20 and by the bead 17. Thus, assuming for purposes of illustration that, because of the higher temperature and of the greater shrinkage of the flashing 27 relative to that of the neck 2 after the container is removed from the mold, the flashing 27 introduces a force as indicated by the arrow D, FIG. 3, that tends to pull the neck of the container to the right. The flange 20 will collapse at the near side while being lifted at the far side to accommodate the stress introduced by the force D without permanent distortion.

In the finishing of the container, the molding as shown in FIG. 3, is first cleaned of the flashings 27 and 28, which can readily be punched out along the thinned sections 29 and 30, and the blow chamber is rough cut as by a guillotine mechanism along a cutting line such as the line E that is slighlty removed from the flange 20 and which provides a cut edge 31 through the blow chamber 25, see FIG. 5. The container is then trimmed accurately in a subsequent operation along the top of the flange 20, as indicated by the line F. To position the flange 20 accurately so that it can be trimmed, there is provided a split cutting die 32 having a tongue 33 that enters the outwardly open groove 22. The tongue 33 of the die has a leading wall 34, an inner wall 35, and an outer wall 36. The leading wall 34 and the inner wall 35 conform respectively to the wall 16 of the finish 3 and the shoulder 18 of the bead 17, while the outer wall 36 conforms generally to the flange 20, but is inclined at an angle that is slightly greater than the normal or as-molded angle of the flange 20 so that the flange 20 is deflected from its normal position, as illustrated in dotted lines in FIG. 5, to the cutting position illustrated in full lines in FIG. 5. In other words, the tongue 33 is forced between the shoulder 22 and the flange 20 and thus grips the container to hold it firmly and also positioning the flange. To avoid forces tending to crush the neck of the container or to distort it, the walls 35 and 36 of the tongue 33 are inclined in opposite directions from and at substantially the same angle to a plane normal to the axis A, or in other words, diverge outwardly at the same angle from the plane normal to the axis A, whereby, when the die 32 is closed, the wedge-like action of the walls 35 and 36 are on the opposed flange 20 and shoulder 18 of the container, develop forces that are primarily parallel to the axis A and the forces on both the flange 20 and shoulder 18 are substantially equal. The flange 20 is thus not only positively positioned and held despite its inherent flexibility and the variations in manufacture, but is also positioned at a more favorable angle so that it can be trimmed exactly without leaving any portion of the wall 26 of the blow chmaber and without unduly thinning the flange by cutting away portions of it. After the flange 20 is positioned and clamped in the die 32, it may then be conveniently trimmed as by a blade 37 which may be fixed within normal manufacturing tolerances relative to the die 32 and thus relative to the edge 21 of the flange 20. The possibility of chips or trimmings falling into the container during the trimming is minimized by the fact that the free edge 21 of the flange 20 is remote from the opening 4 and because the trimmings are adapted to be readily removed.

Figure 2:
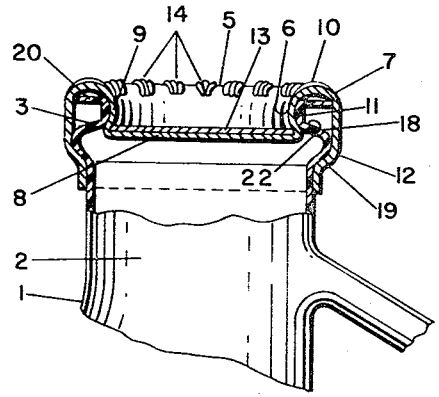
FIG. 2 is a fragmentary view similar to FIG. 1 and illustrating the closure in position on the container.
Figure 6:
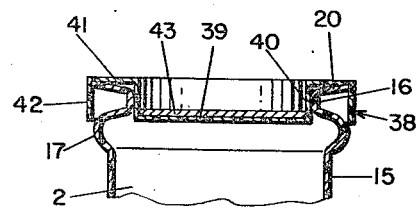
FIG. 6 is a fragmentary view in section of the finish of the container of FIG. 1, but with a cap-type closure rather than a hood-type closure.

While the invention is illustrated in FIGS. 1 and 2 in conjunction with a hood-type closure 5, other types of enclosures may be used. In FIG. 6, there is illustrated a container in accordance with this invention that has been provided with a cap-type closure 38 having a plug portion including a diaphragm 39 and a side wall 40 and having a cover portion including a rim 41 and a depending skirt 42. The closure 38 may also be provided with a disc 43.

The pouring flange 20 provides for a clean cut-off of the flow in pouring a liquid from the container and, because of the inclination, will drain back into the container any droplets remaining in the flange after pouring has been stopped. A further advantage of the pouring flange is that it acts to support the wall 16 against bending radially outwardly under the stress imposed by the closure, thus increasing the sealing pressure that can be developed between the closure and the wall 16.

What we claim and desire to protect by Letters Patent is:

1. A semi-rigid plastic container having a neck and a finish comprising an integral extension of said neck, which finish has an opening defining the mouth of the container and is adapted to receive a closure having a plug portion for closing the mouth and a cover portion for covering the end of the finish, said finish comprising a plug-receiving wall about the mouth and having an inner surface adapted to cooperate in sealing engagement with the plug portion of the closure and an outer surface opposite from said inner surface, a shoulder circumferentially of the finish between said plug-receiving wall and said neck and extending radially outwardly relative to the axis of the opening, and a flange defining a pouring lip extending radially outwardly from said plug-receiving wall at the end of said wall opposite from said shoulder and terminating in a peripheral edge having a diameter substantially equal to the maximum diameter of said shoulder, said flange being substantially normal to the axis of the opening and cooperating with said shoulder and said plug-receiving wall to define an outwardly-open groove, said flange and said shoulder being arranged at substantially equal angles to and diverging in opposite directions outwardly from a plane centrally of said groove and normal to the axis of the opening, said container being blow-molded by fluid pressure applied at said inner surface of said plug-receiving wall whereby said outer surface of said plug-receiving wall and the corresponding surfaces of said flange and said shoulder are die-formed and the inner surface of said plug-receiving wall and the corresponding surfaces of said flange and said shoulder are characterized by smoothly-drawn blow-molded features, and whereby the thickness of said flange and said shoulder are reduced relative to the thickness of said plug-receiving wall.

2. A semi-rigid plastic container in accordance with claim 1 having an outwardly bowed bead between said plug-receiving wall and said neck and said shoulder comprises the wall of said head adjacent to said plug-receiving wall, and a second shoulder formed by the wall of said bead adjacent to said neck.

3. A semi-rigid plastic container in accordance with claim 1 having a handle extending laterally from and to one side of said neck and substantially on a center plane diametrically of said mouth.

References Cited

UNITED STATES PATENTS

| 77,008 | 4/1868 | De Forrest | 215—31 |
|---|---|---|---|
| 1,813,063 | 7/1931 | Martin | 215—39 X |
| 2,099,005 | 11/1937 | Ferngren. | |
| 2,099,056 | 11/1937 | Ferngren. | |
| 2,379,959 | 7/1945 | Goodwin et al. | 215—38 |
| 3,086,671 | 4/1963 | Zalwski | 215—31 |
| 3,171,458 | 3/1965 | Strong. | |
| 3,199,750 | 8/1965 | Livingstone. | |

FOREIGN PATENTS 722,174 12/1931 France.

JOSEPH R. LECLAIR, *Primary Examiner.*

D. F. NORTON, *Assistant Examiner.*

UNITED STATES PATENT OFFICE

CERTIFICATE OF CORRECTION

Patent No. 3,343,698                      September 26, 1967

Russell H. Anderson et al.

It is hereby certified that error appears in the above numbered patent requiring correction and that the said Letters Patent should read as corrected below.

Column 6, line 47, for "head" read -- bead --.

Signed and sealed this 15th day of October 1968.

(SEAL)
Attest:

Edward M. Fletcher, Jr.                      EDWARD J. BRENNER

Attesting Officer                           Commissioner of Patents